United States Patent [19]

Tokuda et al.

[11] 4,028,602
[45] June 7, 1977

[54] CONTROL CIRCUIT OF AN ELECTRIC MOTOR COMPRISING AN OUTPUT TRANSISTOR OF NPN TYPE

[75] Inventors: Kazuo Tokuda; Masanobu Tsugita, both of Tokyo; Hiroshi Minakuchi, Kadoma, all of Japan

[73] Assignees: Nippon Electric Company, Ltd.; Matsushita Electric Industrial Co., Ltd., Japan

[22] Filed: July 9, 1975

[21] Appl. No.: 594,226

[30] Foreign Application Priority Data

July 11, 1974 Japan .................................. 49-79951

[52] U.S. Cl. ........................ 318/345 B; 318/345 F
[51] Int. Cl.[2] .......................................... H02P 5/12
[58] Field of Search ..................... 318/345 B, 345 F

[56] References Cited

UNITED STATES PATENTS 3,422,331  1/1969  Kearns .......................... 318/345 B Primary Examiner—James R. Scott
Assistant Examiner—Morris Ginsburg
Attorney, Agent, or Firm—Ostrolenk, Faber, Gerb & Soffen

[57] ABSTRACT

An automatic speed control circuit for an electric motor is provided with a d.c. amplifier circuit having an output transistor of npn type. The motor is driven by a control signal supplied from the collector of the output transistor to control the motor speed. The collector of the output transistor is connected to one terminal of the electric motor, while another terminal of the motor and the emitter of the output transistor are respectively coupled to the positive and the negative terminals of a d.c. power source. The control signal supplied from the output transistor to the motor is changed in compliance with any variation of the power source. Therefore, the motor speed is independent of any variation of the power source.

9 Claims, 4 Drawing Figures

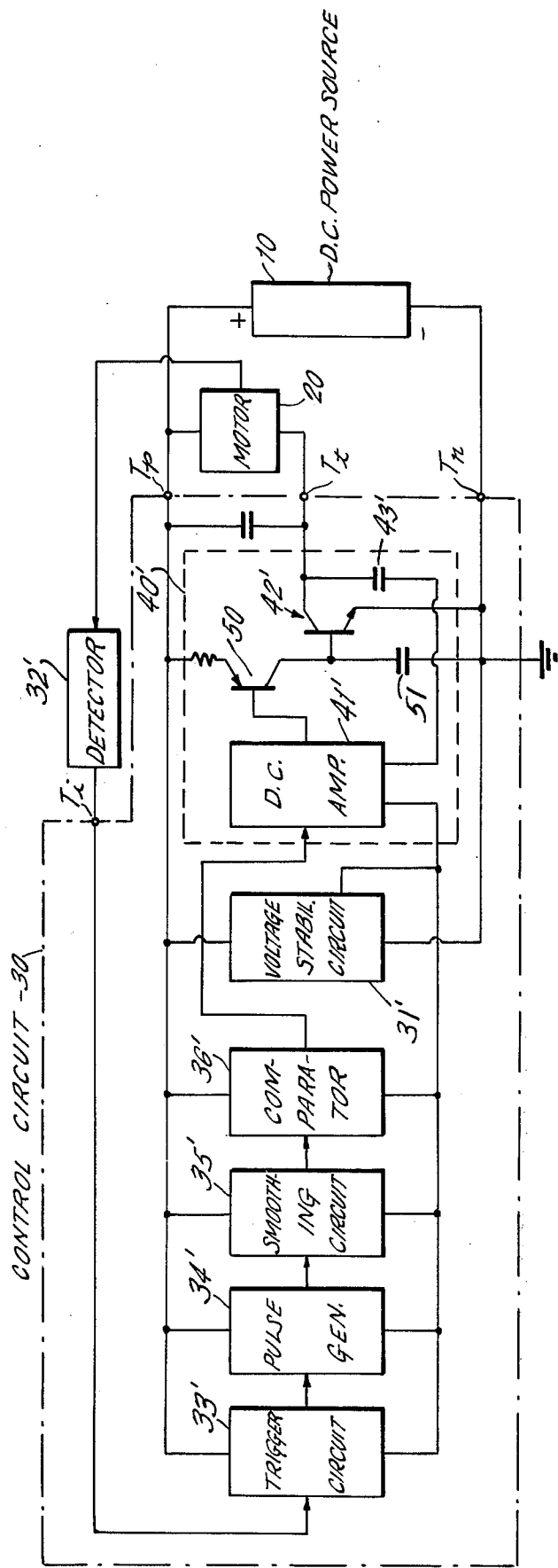

CONTROL CIRCUIT OF AN ELECTRIC MOTOR COMPRISING AN OUTPUT TRANSISTOR OF NPN TYPE

BACKGROUND OF THE INVENTION

This invention relates to an automatic speed control circuit for an electric motor, and especially to a circuit for controlling the voltage between two terminals of the motor.

In the automatic speed control circuit of the above mentioned type, it is typical to detect the speed of a motor represented by revolutions per minute (r.p.m.) and convert the detected input into a d.c. level corresponding to the speed of the motor, and thereafter, the d.c. level is compared with a reference level of a fixed value to develop a difference or error signal supplied to a d.c. amplifier circuit driving the motor.

The d.c. amplifier circuit to which a stabilized voltage is given from a voltage stabilizing circuit is provided with an output transistor connected in series with the motor. The serial circuit of the output transistor and the motor is directly coupled across the terminals of a d.c. power source in order to avoid any level reduction of a source voltage due to the voltage stabilizing circuit. Accordingly, non-stabilizing voltage is supplied from the power source to the serial circuit of the output transistor and the motor.

As a result, the output transistor should be connected to the motor so that any change or fluctuation of the source voltage may be removed by the output transistor.

In a conventional control circuit, a pnp transistor is used as the output transistor of the d.c. amplifier circuit. In this case, the emitter of the pnp transistor is coupled to the positive terminal of the d.c. power source while its collector is connected to one terminal of the motor. Further, another terminal of the motor is joined to the negative terminal of the power source which is typically at earth potential. Moreover, a negative feedback circuit comprising a capacitor is inserted between an output side and one input of the d.c. amplifier circuit to reduce the ripple component of a control signal driving the motor.

According to this circuit using a pnp transistor, no fluctuation of the power source affects electromotive force of the motor to be absorbed by the pnp transistor, and any ripple component is also effectively suppressed by the negative feedback circuit.

However, the conventional circuit is unsuitable for a semiconductor integrated circuit because a high power pnp transistor should be prepared by the semiconductor integrated circuit.

On the other hand, when an npn transistor which is easily prepared by the semiconductor integrated circuit is employed as the output transistor of the d.c. amplifier circuit, the npn transistor is inevitably coupled between the negative terminal of the power source and one terminal of the motor to carry out the same control as the pnp transistor. Accordingly, another terminal of the motor should be connected with the positive terminal of the power source which supplies any fluctuating voltage. Thus, in this circuit, since no fluctuating voltage of the power source is absorbed by the npn transistor, a voltage between both terminals of the motor irregularly varies by any fluctuation of the power source and the resultant hunting occurs in the motor.

SUMMARY OF THE INVENTION

It is an object of this invention to provide an automatic speed control circuit suitable for fabrication as a semiconductor integrated circuit wherein the d.c. motor does not experience any hunting.

It is a further object of this invention to provide a control circuit of this type which uses an npn transistor as the output transistor of the d.c. amplifier circuit.

It is another object of this invention to provide a control circuit of the type described supplying a control signal which is independent of any variation of a power source to a motor.

It is still another object of this invention to provide a control circuit of the type described above and having a stabilizing circuit which enables to absorb any variation of the power source at a negative terminal side of the power source.

According to this invention, there is obtained a circuit to be connected to a d.c. power source having a positive and a negative terminal, and an electric motor having two terminals for controlling actual speed by adjustment of a voltage between said two terminals of said electric motor, comprising first means connected between said positive and negative terminals of said d.c. power source for supplying a voltage stabilized to a potential of said positive terminal, second means responsive to a signal of a frequency representative of said actual speed and said stabilized voltage for producing a d.c. signal corresponding to the actual speed of said motor, and third means including an output transistor of npn type having a base, an emitter and a collector, and a level shift circuit, and responsive to said d.c. signal of said second means for amplifying said d.c. signal and supplying the amplified signal to said motor as a control signal, said level shift circuit being responsive to said d.c. signal and being coupled to the base of said output transistor to feed said level shifted d.c. signal independent of any variation of said power source, and said emitter and collector of said output transistor being respectively connected to the negative terminal of said power source and one of said terminals of said motor in which another terminal is coupled to said positive terminal of said power source.

BRIEF DESCRIPTION OF THE DRAWING

FIG. 3 shows a block diagram of a motor speed control circuit according to this invention, and, FIG. 4 is one embodiment of a voltage stabilizing circuit employed in this invention.

PRIOR ART

Figure 1:
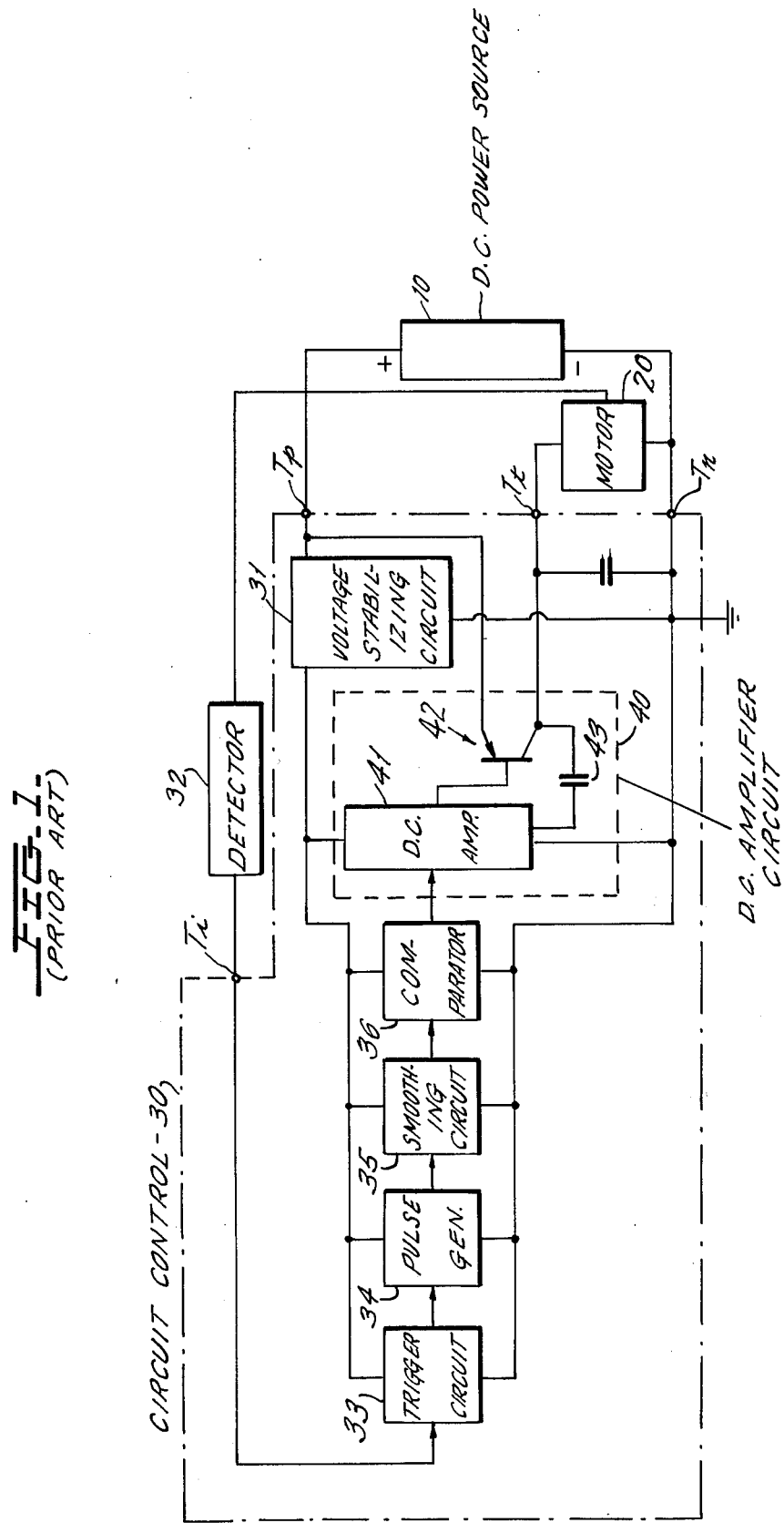
FIG. 1 is a block diagram of a conventional control circuit for an electric motor.

Referring to FIG. 1, a d.c. power source 10 and a motor 20 are connected to a conventional control circuit 30 which is provided with terminals T$i$, T$p$, T$t$ and T$n$. The positive and negative terminals of the d.c. power source are respectively connected to terminals T$p$ and T$n$ of the control circuit 30, and the motor 20 is coupled across terminals T$t$ and T$n$ the latter terminal being at earth ground.

The control circuit 30 is equipped with a voltage stabilizing circuit 31, a trigger circuit 33, a pulse generator 34, a smoothing circuit 35 and a comparator 36. A signal from the comparator 36 is fed to a d.c. amplifier circuit 40 which has a d.c. amplifier 41 and an output transistor 42 of pnp type.

The collector and emitter of the output transistor 42 is respectively connected to terminals $T_t$ and $T_p$ for controlling the motor. Therefore, the output transistor 42 and the motor 20 are connected in series.

A detector 32 is responsive to the motor speed produces a pulse signal or a sine-wave signal of a frequency proportional to the motor speed to feed to the terminal $T_i$ of control circuit 30. The signal from detector 32 is sent to the trigger circuit 33 where it is converted into a trigger pulse train. The pulse generator 34, responsive to the trigger pulse train generates a pulse signal of a predetermined width and height and which is proportional to the motor speed in its repetition frequency. The pulse signal is supplied to the smoothing circuit 35 for conversion to a d.c. voltage and thereafter, the d.c. voltage is given to the comparator 36 to be compared with a predetermined reference voltage. The signal representative of the difference between the two d.c. voltages is supplied to the d.c. amplifier circuit 40. After amplification, the difference signal is fed to the base of output transistor 42 to control a voltage of the motor 20. The motor speed is thus adjusted to a fixed speed.

On the other hand, the voltage stabilizing circuit 31 supplies a stabilized voltage to at least the pulse generator 34, the smoothing circuit 35 and the comparator 36. In general, ground is the fixed reference potential of voltage stabilizing circuit 31 and fluctuations of the power source 10 are absorbed at the positive terminal of circuit 31 thereof to produce the stabilizing voltage. The stabilizing voltage output of circuit 31 is not, however, supplied to the serial circuit of the motor 20 and the output transistor 42 in order to avoid level reduction of a supply voltage due to the voltage stabilizing circuit 31. Therefore, any variation of the supply voltage from the power source 10 should be removed at the serial circuit of the motor 20 and the output transistor 42 of the d.c. amplifier circuit 40. As shown in FIG. 1, since the pnp transistor is adapted to be connected between the terminals $T_p$ and $T_t$ of the control circuit 30, voltage variation of the power source 10 is thus absorbed by pnp transistor 42 (i.e., current to motor 20 is controlled only by the voltage applied to the base of transistor 42 by amplifier 41).

The d.c. amplifier circuit 40 is also provided with a capacitor 43 which is coupled between the collector of the output transistor 42 and an input side of the d.c. amplifier 41. This capacitor suppresses any ripple component of the signal supplied to the motor 20. In this circuit, a voltage across the capacitor 43 undergoes no influence of any variation of the power source 10 because this variation is absorbed by the pnp transistor 42. Therefore, this control circuit 30 is able to control the motor speed without being influenced by any variation of the power source 10.

Figure 2:
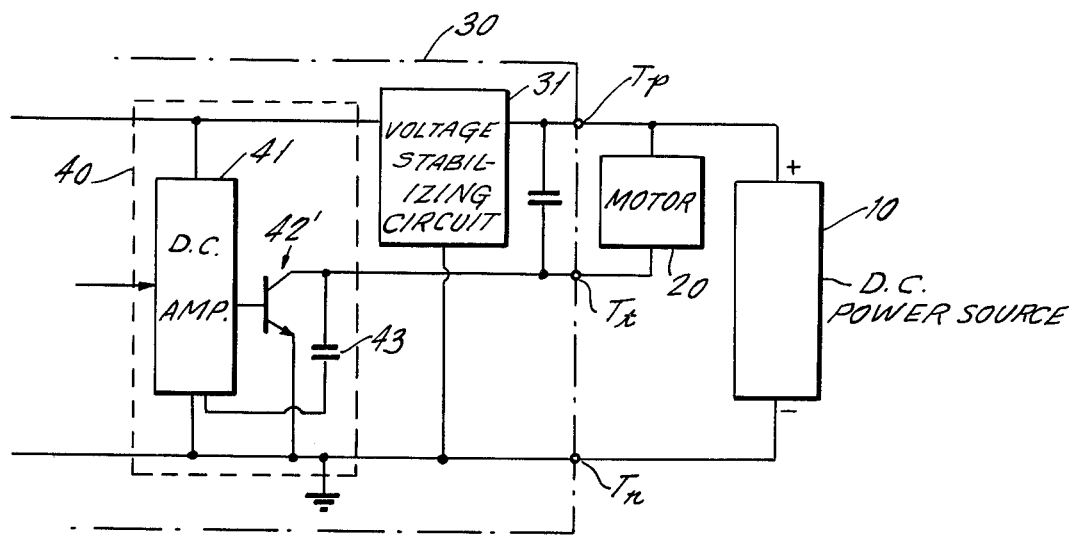
FIG. 2 is a circuit diagram in which an npn transistor is employed as an output transistor.

Referring to FIG. 2, the output transistor of the pnp type is substituted by an npn transistor 42' to facilitate fabrication of a semiconductor integrated circuit. However, in this case, the npn transistor 42' should be inserted across the terminals $T_t$ and $T_n$ to carry out the same control of the motor 20 as the pnp transistor. Accordingly, the motor 20 is inevitably connected between the terminals $T_p$ and $T_t$. But, a voltage supplied from the power source 10 to the terminal $T_p$ is irregularly varied while a voltage between two terminals of the motor 20 has no relationship to any variation of the power source 10. The resultant control signal which is provided to the motor 20 through the output transistor 42' is also independent of variations of the power source 10. Consequently, a voltage across the capacitor 43 is rapidly varied over a wide range by a sudden change of a voltage supplied to the output transistor 42', and any hunting takes place in the motor 20.

As a result, it takes a long time for stabilization of the motor 20 and the control circuit 30.

DETAILED DESCRIPTION OF THE PREFERRED EMBODIMENT

Referring to FIG. 3, this embodiment is provided with a power source 10, a motor 20 and a control circuit 30. In the control circuit 30, reference numbers to which primes are appended correspond to FIG. 1. It should be noted that a voltage stabilizing circuit 31' is constructed by a circuit of a parallel-connected type or a series-connected type in which a positive potential of the power source 10 serves as a reference level. In the voltage stabilizing circuit 31' of this type, any variation of the source voltage is absorbed at a negative terminal of the stabilizing circuit 31' which is connected to the terminal $T_n$, and a constant voltage between two output terminals of the stabilizing circuit 31' is supplied to a trigger circuit 33', a pulse generator 34', a smoothing circuit 35', a comparator 36' and a d.c. amplifier 41'. However, the constant voltage from the stabilizing circuit 31' is varied with respect to ground which is the negative potential of the power source 10 because the positive potential of the power source 10 is the reference level of the stabilizing circuit 31'. Accordingly, the input and output potentials of the d.c. amplifier circuit 40' are varied relative to ground in conformance with any variations of the source voltage.

The d.c. amplifier circuit 40' is provided with a d.c. amplifier 41', an output transistor 42' of npn type, and a level shift transistor 50 of pnp type. The collector of the output transistor 42' is connected to the terminal $T_t$ while the emitter is coupled to the terminal $T_n$ of the earth potential. One terminal of the motor 20 is connected to terminal $T_t$ to form a serial circuit with the output transistor 42', and another one is coupled to the positive terminal $T_p$ of the power source 10. Further, at the amplifier circuit 40' a capacitor 43' is connected from its output side to its input side to feed back the control signal from the amplifier circuit 40'.

In this embodiment, the input and output signals of the amplifier circuit 40' are varied relative to ground as described above, and therefore, a voltage across the feedback capacitor 43' is fluctuated with any variation of the source voltage. Thus, the capacitor 43' undergoes only the influence of any fluctuation of the motor 20. Consequently, the control circuit 30 is able to carry out stable control of the motor speed without being affected by fluctuations of the source voltage.

Moreover, since the emitter of the output transistor 42' is connected to the terminal $T_n$ of the earth potential, there should be supplied a voltage of about 0.7 to 0.8 volt which is substantially equal to a forward voltage of a diode formed by the base-emitter of the transistor 42' to drive the base of the transistor 42'. The transistor 50 of pnp type is connected to the output transistor 42' to shift an output of the d.c. amplifier 41'. The level shift transistor 50 in this embodiment is inserted between the base of the output transistor 42' and the terminal $T_p$ which is typically at a positive potential relative to terminal $T_n$. Accordingly, when the voltage of the power source 10 varies with respect to ground, the lowest potential of the amplifier 41' is also changed with respect to ground and as a result, the output level of the amplifier is automatically shifted by the pnp transistor 50 to maintain the drive current of output transistor 42'. When the motor is driven by the control signal of the output transistor 42', an extraordinary oscillation often takes place, but a capacitor 51 prevents this oscillation.

Figure 4:
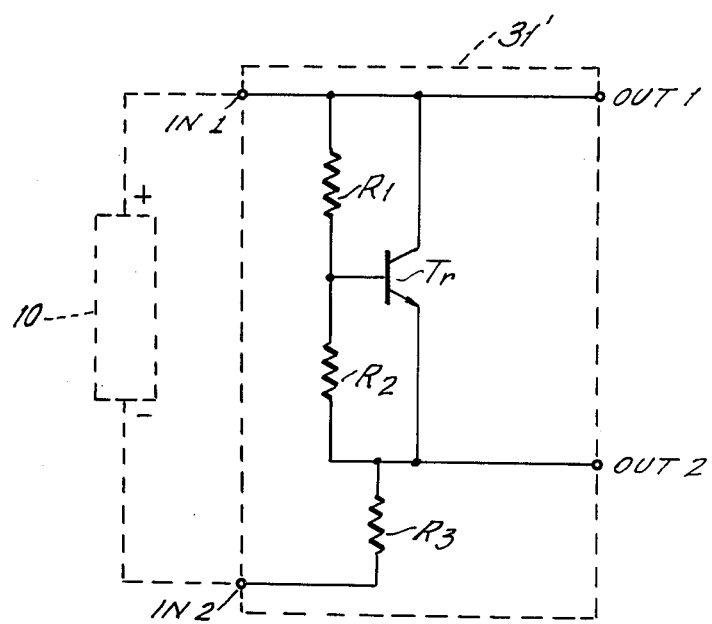

Referring to FIG. 4, one embodiment of the voltage stabilizing circuit 31' is equipped with a transistor T$r$ and three resistors R1, R2 and R3. Two input terminals (in 1) and (in 2) are respectively connected to the positive and negative terminals of the power source 10. When any variable d.c. voltage is supplied between the input terminals (in 1) and (in 2) from the d.c. power source 10, any variation component is absorbed by the resistor R3, and as a result, a stabilized voltage is fed from the output terminals (out 1) and (out 2). The stabilized voltage is varied to a negative potential of the power source 10, but it is constant to a positive potential of the power source 10.

According to this invention, there is obtained a control circuit of an electric motor which is suitable for a semiconductor integrated circuit and provides stable control of the motor.

What is claimed is:

1. A circuit for controlling actual speed of an electric motor, the circuit being provided with first, second, third and fourth terminals, the first and second ones being respectively connected to positive and negative terminals of a d.c. power source, the first and third ones being coupled to the electric motor of which actual speed is supplied to the fourth one in the form of an electric frequency signal, wherein the improvement comprises:

first means connected between said first and second terminals for supplying a stabilized voltage which is stabilized in reference to a potential fed to the first terminal and which is arbitrarily varied relative to ground;

second means connected to the first means and responsive to said frequency signal representative of said actual speed of the electric motor for generating a difference signal for adjusting the actual speed of the motor to a desired value;

third means responsive to said difference signal for amplifying said difference signal and applying the amplified signal to said motor as a control signal, said third means comprising an output transistor of npn type provided with a base, an emitter and a collector and a level shift circuit coupled between said output transistor and said second means, said level shift circuit being resposive to said difference signal to provide a level shifted d.c. signal to the base of said npn transistor, said level shifted d.c. signal being independent of any variation of said power source, said emitter and collector of said output transistor being respectively connected to said second and third terminals.

2. The circuit as claimed in claim 1, wherein said third means further comprises first capacitance means responsive to said control signal supplied to said motor for feeding it back to an input side of said third means.

3. The circuit as claimed in claim 2, wherein said third means further comprises second capacitance means connected between the base and emitter of said output transistor to prevent any extraordinary oscillation.

4. The circuit as claimed in claim 3, wherein said second means comprises pulse generating means responsive to said signal of a frequency representative of said actual speed for producing a pulse train of a predetermined pulse width and height, said pulse train being proportional to a said frequency of said signal in a repetition frequency, smoothing means responsive to said pulse train for converting said pulse train to a d.c. level proportional to said repetition frequency of said pulse train, and, comparator means responsive to said d.c. level for comparing said level with a fixed d.c. level corresponding to the desired speed of said motor to thereby develop said difference signal for adjusting the actual motor speed to the desired motor speed.

5. The circuit as claimed in claim 4, wherein said first means comprises a stabilizing means connected to said first terminal and a resistor element coupled to said second terminal, said stabilizing means and said resistor element being interconnected with each other, and said stabilized voltage to said potential of said positive terminal being derived across said stabilizing means.

6. The circuit as claimed in claim 5, wherein said stabilizing means is parallel-connected to said power source.

7. The circuit as claimed in claim 2, wherein said level shift circuit of said third means comprises a pnp transistor having a base, an emitter and a collector, the collector of said pnp transistor responsive to said difference signal which is applied to its base and being coupled to the base of said output transistor, and the emitter of said pnp transistor being responsive to said potential of said positive terminal.

8. The circuit as claimed in claim 4, wherein the negative terminal of said power source is grounded.

9. The circuit of claim 6, wherein said stabilizing means comprises a stabilizing transistor having its emitter and collector coupled between said power source and said resistor element;

voltage divider means coupled across the emitter and collector terminals of said stabilizing transistor and having an intermediate point coupled to the base of the stabilizing transistor;

the output of said stabilizing transistor being taken across said collector and emitter which are coupled to said third means.

\* \* \* \* \*